United States Patent
Callaluca et al.

[11] Patent Number: 5,967,538
[45] Date of Patent: Oct. 19, 1999

[54] ADJUSTABLE MOTORCYCLE TRIPLE TREE

[76] Inventors: Peter A. Callaluca, 31 Middlesex Dr., Littleton, Mass. 01460; John F. Fuller, III, 182 Prospect Hill, Harvard, Mass. 01451; Donald W. Conn, 231 Groton Rd., Westford, Mass. 01886

[21] Appl. No.: 09/064,904

[22] Filed: Apr. 23, 1998

[51] Int. Cl.[6] .................................................. B62K 21/02
[52] U.S. Cl. .......................... 280/279; 180/219; 280/280
[58] Field of Search ............................ 180/219; 280/274, 280/278, 279, 280, 281.1, 287, 775; 74/551.3, 551.6; 384/255

[56] References Cited

U.S. PATENT DOCUMENTS

| | | | |
|---|---|---|---|
| 3,866,946 | 2/1975 | Robinson | 384/255 |
| 4,565,384 | 1/1986 | Dehnisch | 280/279 |
| 4,600,207 | 7/1986 | Zosi | 280/279 |
| 4,624,470 | 11/1986 | Love | 270/279 |

FOREIGN PATENT DOCUMENTS

| | | | |
|---|---|---|---|
| 523424 | 4/1955 | Italy | 280/279 |
| 403235775 | 10/1991 | Japan | 280/280 |

*Primary Examiner*—Anne Marie Boehler
*Attorney, Agent, or Firm*—John P. McGonagle

[57] ABSTRACT

An improved adjustable motorcycle triple tree having a top tree subassembly, a bottom tree subassembly, and a solid tree stem interconnecting the top tree subassembly with the bottom tree subassembly. The tree stem is positioned within the hollow bore of a motorcycle frame steering head. The top tree subassembly has a pivot ball which provides two major rake settings. An adjustable rake lock block in the bottom tree subassembly provides means for precise rake settings within the two pivot ball major rake settings.

20 Claims, 6 Drawing Sheets

ADJUSTABLE MOTORCYCLE TRIPLE TREE

BACKGROUND OF THE INVENTION

This invention relates to motorcycles, and in particular to a fork tree by which the fork of a motorcycle is connected to a motorcycle body steering head.

A motorcycle has a frame with a forward wheel, a rear wheel, a motor, a seat and two handle bars connected thereto. The rear wheel is the drive wheel and is connected to the motor, typically by means of a drive chain. The seat is mounted on top of the frame. The front wheel is steerable and connected to the frame by means of a fork, typically hydraulic. The handle bars provide the means for steering manipulation and is connected either directly or indirectly via a fork tree to the fork.

Figure 1:
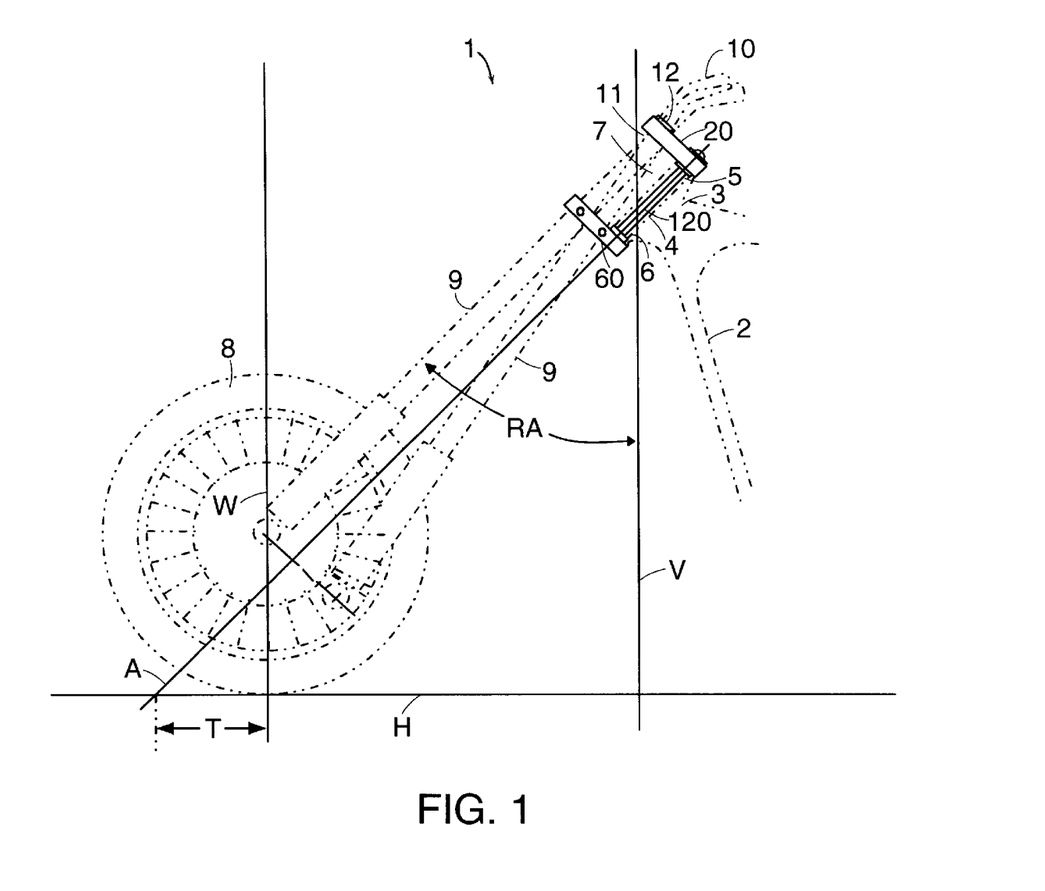
FIG. 1 is a schematic view showing a motorcycle fork and fork tree assembly.

A motorcycle typically is designed so that the front wheel fork is at an angle from a vertical axis through a forward end of the frame. This positioning is generally referred to as a motorcycle's "rake". A motorcycle's rake is generally defined as the inclination angle of the fork from the vertical. See the rake angle "RA" in FIG. 1. Where "V" designates a true vertical and "H" designates a true horizontal. A motorcycle's rake also results in the axle of the forward wheel being positioned forward of said vertical axis. The horizontal distance of the forward wheel's axle from a pre-defined measure is generally referred to as a motorcycle's trail. A motorcycle's trail has been defined as the horizontal distance "T" by which a vertical plane, passing through the front wheel axle "W" trails the point of intersection of the steering axis "A" with a horizontal ground "H".

In order to optimize the riding characteristics of the motorcycle, the rake angle and trail size must be correctly set. If the rake angle and trail are too large, the motorcycle is stable at high speed, but is oversteered and hard to balance at low speeds and in curves. If, on the other hand, the rake angle and trail are too small, or the trail is negative, the motorcycle is easy to steer at low speeds, but has no self steering properties at high speed, and may wobble. Since a rider's size, as well as the desired use of the motorcycle, affect desired rake and trail, some means for adjusting a motorcycle's rake and trail from that set by a manufacturer is desirable.

The precise setting of rake and trail is difficult because of the interrelationship of motorcycle characteristics such as fork tube length and center of gravity. Historically, settings were done by adjusting the spacing between different elements of the steering structure. This is very time consuming and often hit or miss. To provide more precision in setting rake and trail fork tree assemblies were developed. A fork tree assembly initially consisted of a single part connecting the motorcycle's fork tubes to the body steering head. This rapidly evolved into "triple tree" fork assemblies. A triple tree fork assembly typically has an upper tree to which handle bars are attached, a bottom tree to which fork trees are attached, and an intermediate tree element interconnecting the upper and bottom trees and which typically provides means for adjusting the relationship between both thereby affecting the rake and trail of a motorcycle. Triple trees offer rake adjustments allowing the set up of proper rake and trail for desired handling. Raked triple trees can completely alter the low-speed maneuverability, turning radius, and high-speed stability of any bike with a straight frame. A typical prior art triple tree is described in U.S. Pat. No. 4,565,384, "Motorcycle Fork Tree", issued to T. Dehnisch, on Jan. 21, 1986. Another typical triple tree is distributed by Pat Kennedys Custom Cycles, Tombstone, Ariz.

Although triple trees of the prior art provide significant improvements over historical methods for setting rake and trail, it is still a time consuming procedure to adjust rake. Prior art triple trees are also very expensive. Precision repeatability, i.e., the ability to return to and repeat a previous rake and/or trail setting, is also very difficult with prior art triple trees.

SUMMARY OF THE INVENTION

In view of the foregoing disadvantages inherent in the known types of devices now present in the prior art, the present invention provides an improved adjustable motorcycle triple tree. Rake adjustments are simple and may be done quickly. The present invention provides a top tree subassembly, a bottom tree subassembly, and a solid tree stem interconnecting the top tree subassembly with the bottom tree subassembly. The tree stem is positioned within the hollow bore of the motorcycle frame steering head. The top tree subassembly has a pivot ball which provides two major rake settings. An adjustable rake lock block in the bottom tree subassembly provides means for precise rake settings within the two pivot ball major rake settings.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Referring to the drawings in detail wherein like elements are indicated by like numerals, there is shown an embodiment of the invention incorporating an adjustable fork triple tree assembly 1. In a motorcycle, a frame 2 terminates at a front end 7 in a body steering head 3. The steering head 3 is oriented from a lower, forward position to an upper rearward position. The steering head 3 is a straight, tubular section having a hollow bore 4, an open lower end 6 and an open upper end 5. The fork triple tree assembly 1 is comprised of a top tree subassembly 20, a bottom tree subassembly 60, and a solid tree stem 120 interconnecting the top tree subassembly 20 with the bottom tree subassembly 60. The tree stem 120 is positioned within the hollow bore 4 of the body steering head 3. The top tree subassembly 20 is positioned above the steering head open upper end 5 and the bottom tree subassembly 60 is positioned below the steering head open lower end 6. The motorcycle front wheel 8 is attached to left and right (not shown) fork tubes 9 at the front wheel axle W. The fork tubes 9 extend upward from the axle W through the bottom tree subassembly 60 for attachment to the top tree subassembly 20. Left and right handle bars 10 are also rigidly attached to the top tree subassembly 20. Upon an application of force to the handle bars 10, the tree assembly 1 will turn axially thereby causing the fork tubes 9 and front wheel 8 to rotate coaxially with the tree stem 120. The bore 4 of the steering head 3 establishes a fixed steering axis A. However, by adjustments in the tree assembly 1 as described below, rake and trail may be varied.

The top tree subassembly 20 is comprised of a flat plate 21 having a symmetrical, obtuse-angled, general trefoil-like shape. The plate 21 has a top surface 26, a bottom surface 27, a specified thickness 22, an obtuse angle lobe portion 23 positioned rearward and over the stem 120, two acute angle lobe portions 24a, 24b positioned laterally and equally to the left and right of a front wheel 8 vertical plane, and a front side 29 opposite to the obtuse angle lobe portion 23. The acute angle lobe portions 24a, 24b each have holes 25a, 25b formed from the top surface 26 through the plate 21 to the bottom surface 27 for termination of the fork tube upper ends 11. Bolts 12 are attached from the plate top surface 26 through the holes 25a, 25b into the fork tube upper ends 11 thereby securing the fork tubes to the top tree assembly 20. Two additional parallel holes 28a, 28b are formed in the plate 21 from the top surface 26 through the plate 21 to the bottom surface 27, said holes 28a, 28b being positioned near to the front side 29, away from the acute angle lobe portion holes 25a, 25b, and near to the obtuse angle lobe portion 23. The front holes 28a, 28b are adapted to receive handle bars 10. A small aperture 30 is formed through the plate 21 near to the front side 29 between the parallel holes 28. The front aperture 30 provides a channel for control cables.

The obtuse angle lobe portion 23 has a pivot hole 31 formed therein from the top surface 26 through the plate 21 to the bottom surface 27. The pivot hole 31 is circular and has an upper half circumferential portion 32 and a lower half circumferential portion 33. The upper half circumferential portion 32 has a larger diameter than the lower half circumferential portion 33. The junction 36 of the upper half circumferential portion 32 and lower half circumferential portion 33 is a flat radial ridge 37 with a ring depth equal to the difference between the upper half circumferential portion 32 diameter and lower half circumferential portion 33 diameter. The lower half circumferential portion 33 has a round central opening 34 with a diameter decreasing in width toward the plate bottom surface 27. The lower half circumferential portion 33 has two rectangular notches 35a, 35b formed in the junction ridge 37, said notches 35a, 35b extending downwardly partially through the lower half circumferential portion 33 toward the plate bottom surface 27. The notches 35a, 35b are positioned 180° apart along a radial axis parallel to parallel longitudinal axes formed by the two holes 25a, 25b and the two holes 28a, 28b. The lower half circumferential portion 33 also has six screw holes 38 formed in the junction ridge 37, said screw holes 38 extending downwardly through the lower half circumferential portion 33 and through the plate bottom surface 27. The longitudinal axis of each screw hole 38 is perpendicular to the radial axis of the central opening 34.

Figure 5:
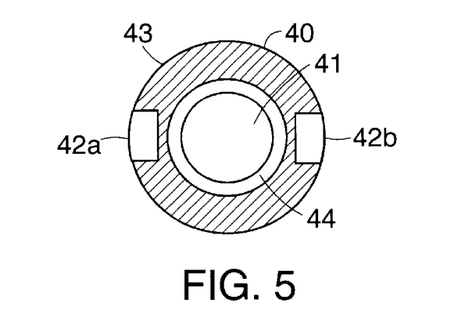
FIG. 5 is a horizontal cross-section of the top tree subassembly pivot ball.

A pivot ball 40 is positioned within the pivot hole 31. The pivot ball 40 has an off-centered, cylindrical hole 41 formed therein resulting in two opposite openings 41a, 41b on the pivot ball surface 43. The pivot ball 40 also has two round apertures 42a, 42b formed therein, said apertures 42a, 42b extending radially inward from the pivot ball surface 43. The apertures 42a, 42b are positioned directly opposite each other along the pivot ball radial axis traverse to the longitudinal axis of the off-centered cylindrical hole 41. The off-centered cylindrical hole 41 has a radial, flange-like ridge 44 formed therein, said ridge 44 being located closer to the pivot ball surface opening 41a than to the opening 41b.

A circular, ring-shaped, pivot ball cap 50 with a central opening 51 is positioned over the pivot ball 40. The outer diameter of the ball cap 50 is slightly less than the diameter of the pivot hole upper half portion 32. The ball cap central opening 51 approximately mirrors the pivot hole lower half portion central opening 34. The ball cap ring portion 52 has an upper surface 54, a lower surface 55 and a radial width approximately equal to the radial width of the junction ridge 37. The ball cap ring portion 52 has six screw holes 53 formed therein, said screw holes 53 corresponding to the junction ridge screw holes 38, said ball cap ring portion screw holes 53 extending downwardly from the ring portion upper surface 54 through the lower surface 55. The screw holes 53 are countersunk at the ring portion upper surface 54. The longitudinal axis of each screw hole 53 is perpendicular to the radial axis of the central opening 51. The ball cap ring portion 52 has two cube-like protrusions 56 extending downwardly through the ring portion lower surface 55. The cube like protrusions 56a, 56b are radially 180° apart. Each protrusion 56a, 56b has a radial hole 57a, 57b formed therein, each hole 57a, 57b having a longitudinal axis coincident with a radial axis of the cap central opening 51. The cap 50 is fitted over the pivot ball 40. A pin 58a, 58b is inserted through each protrusion hole 57a, 57b into a corresponding pivot ball pin hole 42a, 42b. The cap 50 and ball 40 assembly is then placed into the pivot hole 31 via the pivot hole upper portion 32. The cap protrusions 56a, 56b are fitted into the pivot hole notches 35a, 35b. Six screws 59 are then placed through the cap screw holes 53 into engagement with the junction ridge screw holes 38.

As stated above the solid tree stem 120 interconnects the top tree subassembly 20 with the bottom tree subassembly 60. The stem 120 is an elongated, cylindrical element with two ends, an upper end 121 and a lower end 122. The stem upper end 121 is threaded, said threaded portion 121 having a top end 125 and a lower end 126. A lower, top tree, circular nut 123 is threadingly engaged to the stem upper end 121 near to the threaded portion lower end 126. The stem upper end 121 is extended up into the pivot ball off-centered cylindrical hole 41 through whichever pivot ball surface opening 41a, 41b is closest to the top tree plate bottom surface 27. The stem upper end 121 is extended upward into the pivot ball off-centered opening 41 through the plate bottom surface 27 until the stem lower, top tree circular nut 123 engages the pivot ball radial ridge 44. A cap 127 is then threadingly attached to the tree stem upper end 121, through the pivot ball surface opening 41a, 41b farthest from the top tree plate bottom surface 27, said cap 127 engaging the stem upper end 121 until the cap 127 meets the pivot ball radial ridge 44. The tree stem 120 is also notched near to the stem lower end 122, the function of said notch 128 being discussed below.

The bottom tree subassembly 60 is comprised of a steering stop 61 above a stop block 70 connected to a rake lock block 80 attached to a lower tree 100. The tree stem lower end 122 extends downwardly through a central opening 62 in the steering stop 61 and terminates in a central opening 71 in the stop block 70.

The steering stop 61 has a ring like shape with a central opening 62, an upper surface 63 and a lower surface 64. An upwardly projecting flange collar 65 is formed on the steering stop upper surface 63 about the central opening 62. A downwardly projecting stop pin 66 is formed on the steering stop lower surface 64. The stop pin 66 is positioned to the rear of the steering stop 61. The steering stop collar 65 is press fitted into the steering head, hollow bore, open lower end 6. Although the tree stem 120 freely turns radially within the steering stop central opening 62, the steering stop 61 itself is immovable within the steering head bore 4.

The stop block 70 has an upper surface 72, a parallel lower surface 73, a vertical depth 76 between said surfaces 72, 73, a central opening 71, and a mushroom cross-sectional shape in its horizontal plane. The block stem section 74 projects horizontally forward from the central opening 71 to a transverse front side 78 and has a lateral cylindrical hole 77 formed through the stem depth 76, from one stem side 79*a* to another stem side 79*b*, said hole 77 having a longitudinal central axis parallel to the stem front side 78. A portion of the hole 77 overlaps and opens into the central opening 71. The tree stem lower end 122 projects downwardly through the steering stop central opening 62 into the stop block central opening 71 to the stop block lower surface 73 wherein the tree stem lower end 121 is flush with the stop block lower surface 73. The tree stem 120 is radially positioned so that the notch 128 is facing in a forward direction. A cylindrical pin 81 is inserted into the stop block stem section cylindrical hole 77 from one stem side 78*a* to another stem side 78*b*, said pin 81 also engaging the tree stem notch 128 thereby locking said tree stem 120 into place within the stop block 70.

The cap portion 75 of the stop block 70 projects horizontally rearward from the central opening 71 and has a curved vertical channel 69 formed in its upper surface 72. The radial axis of the curved channel 69 is concentric with the radial axis of the central opening 71. The steering stop pin 66 projects downwardly into the stop block channel 69.

Figure 7:
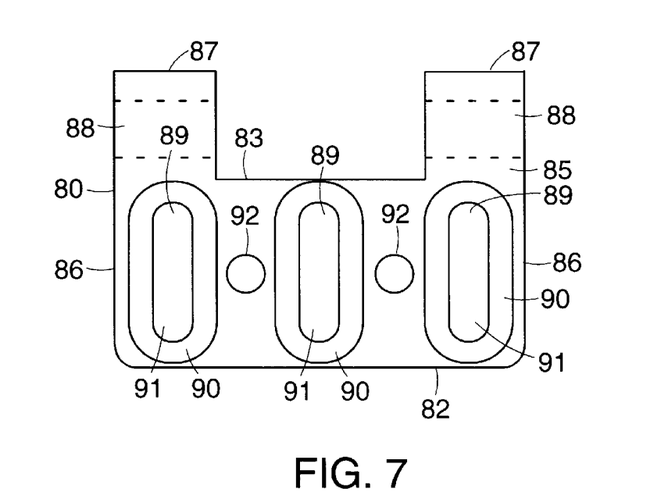
FIG. 7 is a bottom view of the bottom tree subassembly rake lock block.

The stop block 70 is connected to the rake lock block 80 which is positioned forward of the stop block 70. The rake lock block 80 has a generally rectangular shape in a horizontal plane. The rake lock block 80 has a front 82, rear 83, top surface 84, bottom surface 85, two opposite sides 86*a*, 86*b* connecting the front 82 and rear 83, and a vertical depth 94. The rake lock block 80 has a horizontal axis extending from side 86*a* to side 86*b*. The rake lock block 80 has two box-like protrusions 87 extending rearward from the rear 83. The distance between the protrusions 87*a*, 87*b* is slightly greater than the distance between stop block stem sides 79*a*, 79*b*. The protrusions 87*a*, 87*b* each have a horizontal, cylindrical hole 88*a*, 88*b* formed therethrough, each said hole 88 having a longitudinal central axis parallel to the front 82. The rake lock block 80 is attached to the stop block 70 by means of the pin 81 extending through the rake lock block protrusion holes 88*a*, 88*b* and stop block hole 77. The rake lock block has three, parallel, elongated slots 89 formed from the top surface 84 through to the bottom surface 85. The slots 89 each have a horizontal, longitudinal axis parallel to the rake lock block sides 86. Each slot 89 at the rake lock block bottom surface 85 is counter-sunk whereby each slot 89 has a larger opening 90 formed on the bottom surface 85 than its opening 91 at the rake lock block top surface 84. The rake lock block bottom surface 85 also has two parallel, vertical, counter-sunk, screw holes 92 formed therein, one on each side of the middle slot opening 90, each screw hole 92 extending vertically toward the top surface 84. The rake lock block top surface 84 has parallel, ridged corrugations 93 formed therein and extending from side 86*a* to side 86*b*, said ridged corrugations 93 having longitudinal axes parallel to the rake lock block front 82.

The rake lock block 80 is connected to the lower tree 100. The lower tree 100 is a generally laterally, elongated piece with a top surface 101, bottom surface 102, front 103, rear 104, two lateral sides 105, and a vertical depth 119 between said surfaces 101, 102. The front 103 has a solid, general concave shape. Each side 105 has a rounded portion 105*a* adjacent to the front 103 said rounded portion 105*a* then terminating rearwardly in a flat, inwardly angled portion 105*b* terminating at the lower tree rear 104. There is a vertical hole 106*a*, 106*b* formed near each lateral side 105*a*, 105*b*. The holes 106*a*, 106*b* are formed from the top surface 101 through the lower tree 100 to the bottom surface 102. The holes 106*a*, 106*b* provide a channel through which the fork tubes 9 are passed, said holes 106*a*, 106*b* corresponding to the holes 25*a*, 25*b* formed in the top tree plate 21. A horizontal cylindrical hole 110 is formed into each angled side portion 105*b*, each said hole 110 having a longitudinal central axis perpendicular to the horizontal plane of the angled side portion 105*b*. A portion of each hole 110 overlaps and opens into a fork tube opening 106. A tube cam lock assembly 111 comprised of a notched tube clamp 111*a* and bolt 111*b* is inserted into each cylindrical hole 110 in order to lock the lower tree 100 in positioned relative to a fork tube 9. A rectangular notch 107 is formed in the top surface 101 for mounting a headlight. The notch 107 is positioned centrally near to the lower tree front 103. The notch 107 has a vertical screw hole 108 formed therein. A headlight mount 109 is positioned in the notch 107 and attached by means of a screw (not shown) into the screw hole 108. The lower tree 100 has a half-moon notch 112 formed centrally at the rear 104.

Figure 6:
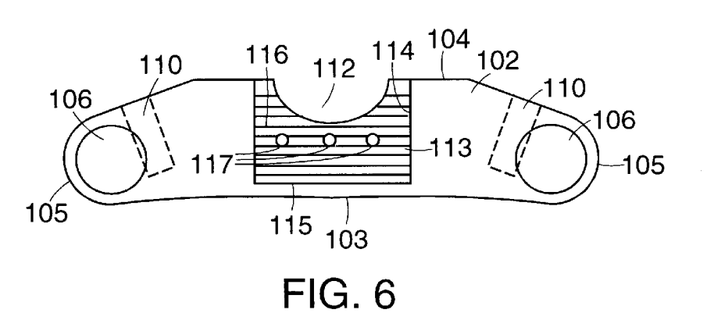
FIG. 6 is a bottom view of the bottom tree subassembly lower tree.

The lower tree bottom surface 102 has a substantial rectangular, central aperture 113 formed therein, said aperture 113 opening onto the lower tree rear 104, extending almost to the lower tree front 103, and extending upward and terminating in a flat, corrugated, upper portion 116 below the top surface 101, said corrugations having longitudinal axes parallel to the lower tree rear 104. The aperture 113 has a vertical depth 114 approximately equal to the vertical depth 94 of the rake lock block 80, and a lateral width 115 approximately equal to the rake lock block lateral width. The upper portion 116 has three, parallel, vertical screw holes 117 formed therein, said screw holes 117 being formed along a line having a longitudinal axis parallel to the lower tree rear 104. The line of screw holes 117 is just forward of the half moon notch 112.

As stated above, the rake lock block 80 is connected to the lower tree 100. The lower tree 100 is positioned over the rake lock block 80 so that the lower tree aperture 113 fits over a portion of the rake lock top surface 84 from the rake block front 82 rearward. The rake block ridged corrugations 93 engage the lower tree aperture flat, corrugated, upper portion 116. The rake block top surface slot openings 91 coincide with the lower tree aperture screw holes 117. Attachment screws 95 with washers 96 are inserted into the rake lock block bottom surface slot openings 90 through the top surface slot openings 91 into engagement with the lower tree bottom surface aperture screw holes 117.

A rectangular protective plate 97 is positioned over the rake lock bottom surface 85. The protective plate 97 has two holes 98 corresponding to the rake block bottom surface screw holes 92. A screw 99 is inserted through each hole 98 into engagement with the rake bottom surface screw holes 92.

Figure 2:
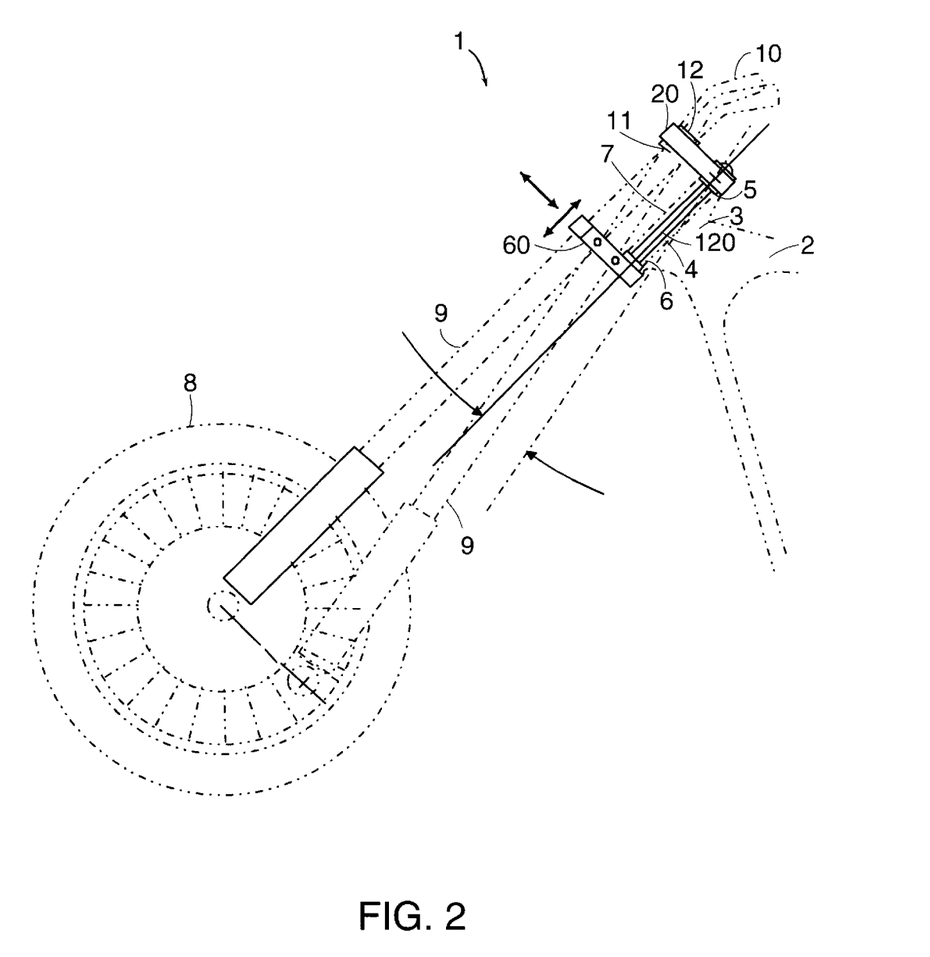
FIG. 2 is a schematic view showing the tree assembly of FIG. 1 illustrating setting adjustments.
Figures 3, 3A:
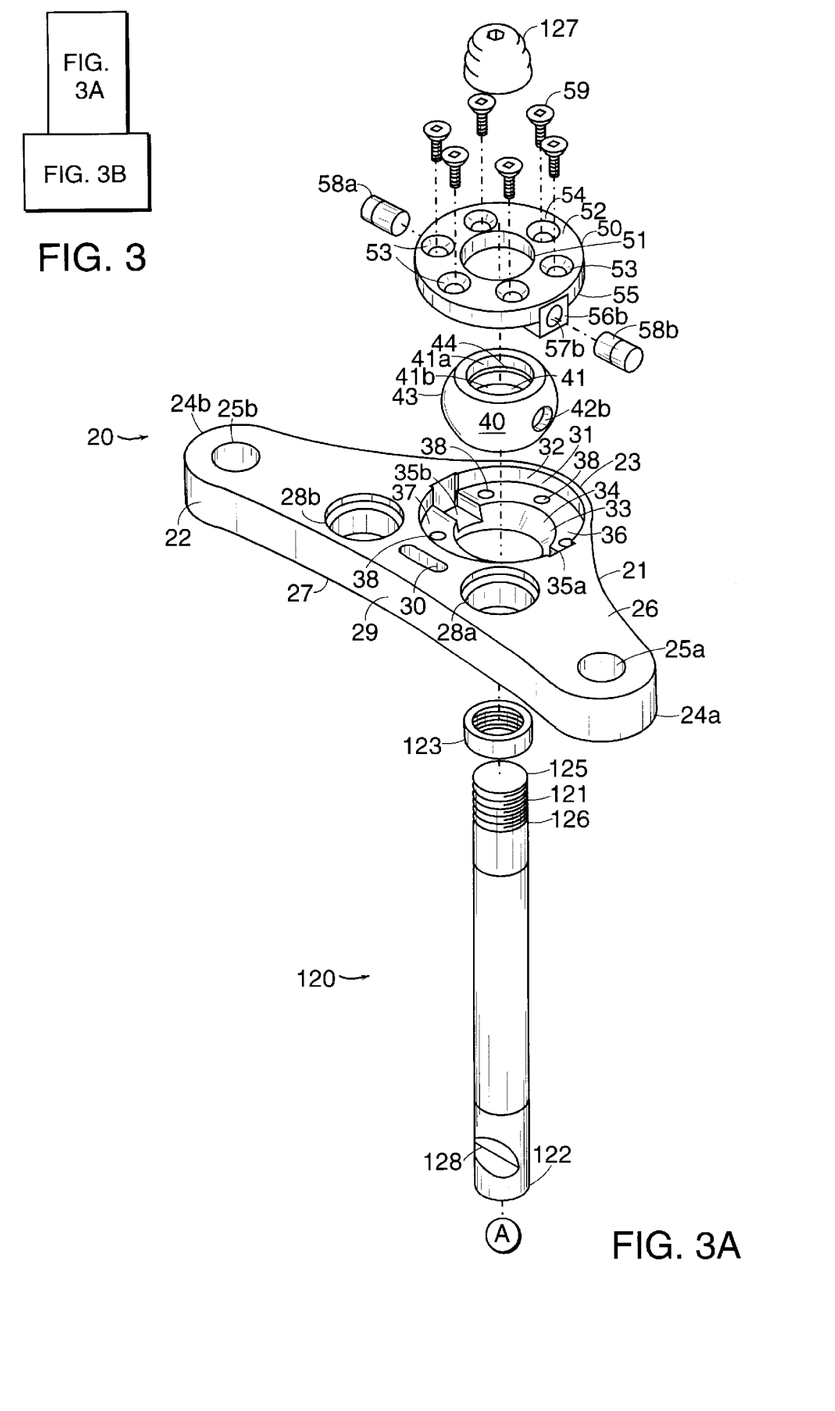
FIG. 3 is an exploded perspective view of the fork assembly of the present invention.
Figure 3B:
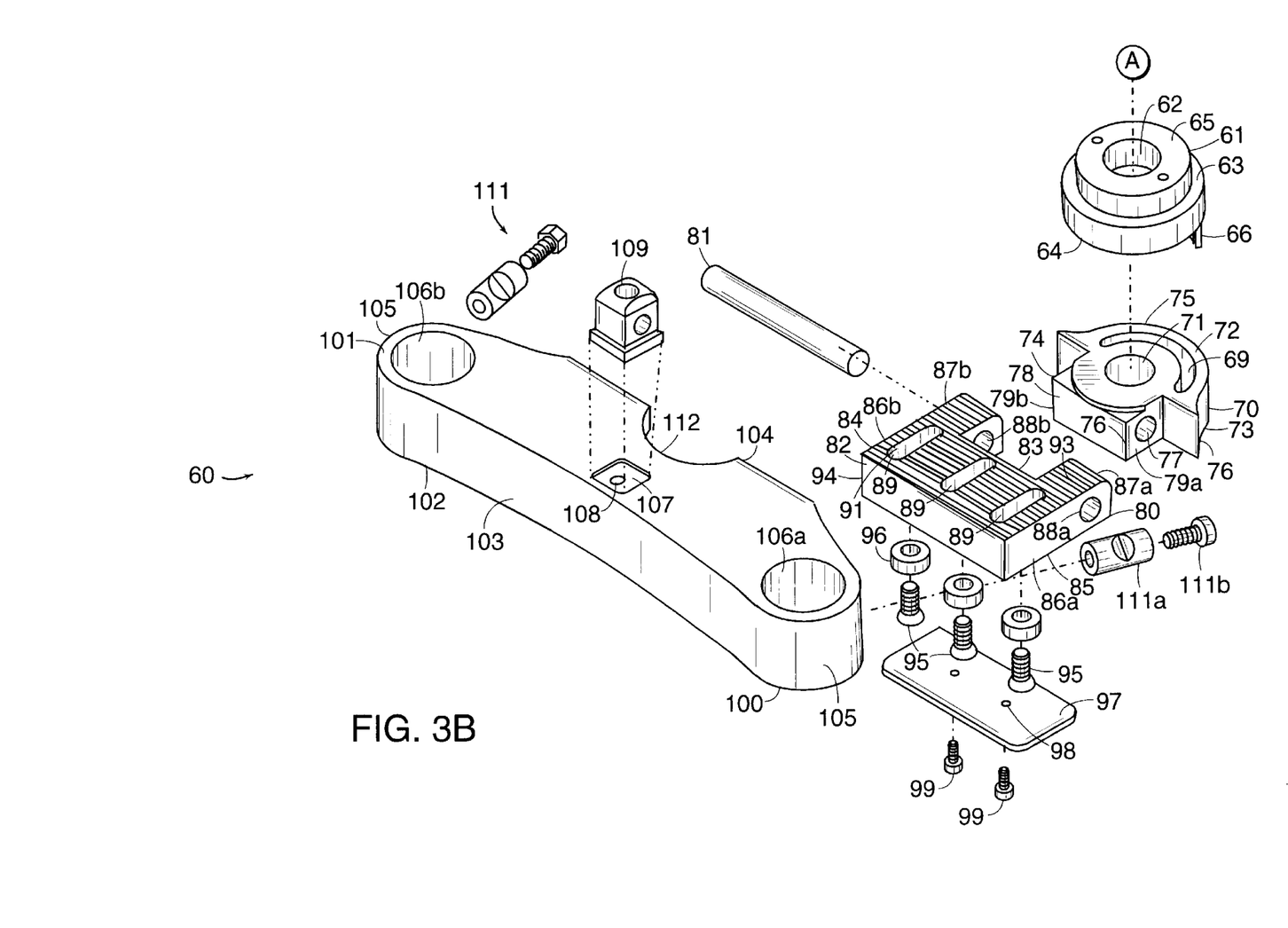
Figure 4:
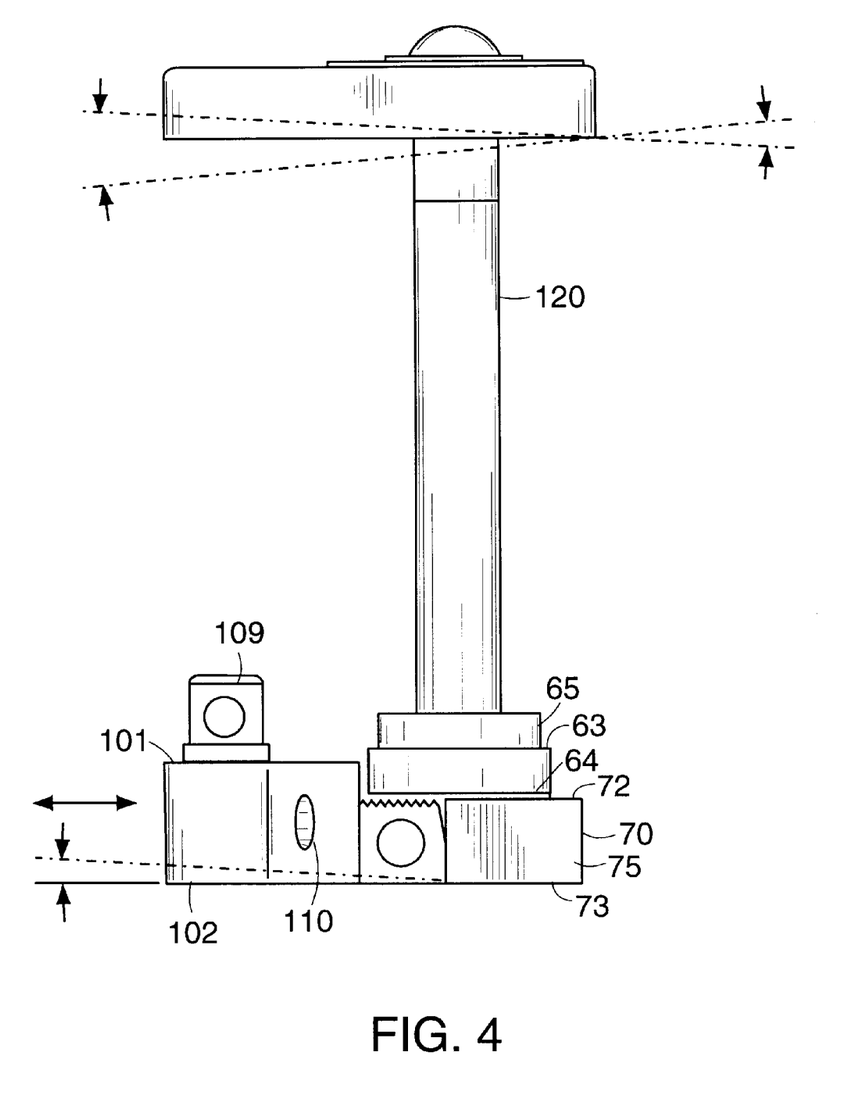
FIG. 4 is a side elevational view of the fork assembly of the present invention.

The operation of the invention may be most clearly understood from FIGS. 2 and 4. The top tree subassembly pivot ball 40 is placed into the pivot hole 31 in one of two positions 180° apart. Each position causes the pivot ball central opening 34 and, therefore, the tree stem 120 to be positioned and tilted differently. The pivot ball 40 provides to major rake settings. Within these two major settings, the rake lock block 80 may be adjusted in relationship to the lower tree 100 and, therefore, the fork tubes 9, so that the lower tree 100 may be tilted in a vertical axis or moved in a horizontal plane or both. Adjustments of the three attachment screws 95 through the rake lock block slots 89 provide these adjustments. The rake and, therefore, trail settings may be made easily and quickly.

It is understood that the above-described embodiment is merely illustrative of the application. Other embodiments may be readily devised by those skilled in the art which will embody the principles of the invention and fall within the spirit and scope thereof.

We claim:

1. In combination with a motorcycle having a frame terminating at a front end in a steering head, said steering head being oriented from a lower, forward position to an upper rearward position, said steering head being a straight, tubular section having a hollow bore, an open lower end and an open upper end, an adjustable motorcycle triple tree, comprising:

a top tree subassembly having a pivot ball which provides two major rake settings;

a bottom tree subassembly having an adjustable rake lock block which provides means for precise rake settings within the two pivot ball major rake settings;

a solid tree stem interconnecting the top tree subassembly with the bottom tree subassembly, said tree stem being positioned within the hollow bore of said motorcycle frame steering head;

wherein said top tree subassembly is positioned above the steering head open upper end and the bottom tree subassembly is positioned below the steering head open lower end;

wherein the motorcycle front wheel is attached to left and right fork tubes laterally attached to a front wheel axle, said fork tubes extend upward from said the axle through the bottom tree subassembly for attachment to the top tree subassembly;

wherein left and right handle bars are rigidly attached to the top tree subassembly;

wherein, said adjustable motorcycle triple tree is adapted to respond to an application of force to the handle bars thereby turning axially and causing the fork tubes and front wheel to rotate coaxially with the tree stem.

2. An adjustable motorcycle triple tree as recited in claim 1, wherein said top tree subassembly is comprised of:

a flat plate having a symmetrical, obtuse-angled, general trefoil shape, said plate having a top surface, a bottom surface, a specified thickness, an obtuse angle lobe portion positioned rearward and over the stem, two acute angle lobe portions positioned laterally and equally to the left and right of a front wheel vertical plane, and a front side opposite to the obtuse angle lobe portion, said acute angle lobe portions each having holes formed from the top surface through the plate to the bottom surface for termination of the fork tube upper ends, said plate having two additional parallel holes formed in the plate from the top surface through the plate to the bottom surface, said holes being positioned near to the front side, away from the acute angle lobe portion holes and near to the obtuse angle lobe portion, said front holes being adapted to receive handle bars, said plate having a small aperture formed through the plate near to the front side between the parallel holes for control cables; said plate obtuse angle lobe portion having a pivot hole formed therein from the top surface through the plate to the bottom surface, said pivot hole being circular and having an upper half circumferential portion and a lower half circumferential portion, said upper half circumferential portion having a larger diameter than the lower half circumferential portion, said pivot hole having a junction formed by the upper half circumferential portion and lower half circumferential portion, said junction being a flat radial ridge with a ring depth equal to the difference between the upper half circumferential portion diameter and lower half circumferential portion diameter, said lower half circumferential portion having a round central opening with a diameter decreasing in width toward the plate bottom surface, said lower half circumferential portion having two rectangular notches formed in the junction ridge, said notches extending downwardly partially through the lower half circumferential portion toward the plate bottom surface, said notches being positioned 180° apart along a radial axis parallel to parallel longitudinal axes formed by the two acute angle lobe portion holes;

said pivot ball being positioned within the pivot hole, said pivot ball having a surface and an off-centered, cylindrical hole formed therein resulting in two opposite openings on the pivot ball surface, said pivot ball also having two round apertures formed therein, said apertures extending radially inward from the pivot ball surface and being positioned directly opposite each other along the pivot ball radial axis traverse to the longitudinal axis of the off-centered cylindrical hole, said off-centered cylindrical hole having a radial, flange-shaped ridge formed therein, said ridge being located closer to the pivot ball surface opening than to the opening; and a bolt attached from the plate top surface through each hole into a fork tube upper end thereby securing each fork tube to the top tree assembly.

3. An adjustable motorcycle triple tree as recited in claim 2, wherein said top tree subassembly is further comprised of:

a circular, ring-shaped, pivot ball cap with a central opening, said ball cap being positioned over the pivot ball.

4. An adjustable motorcycle triple tree as recited in claim 3, wherein:

said solid tree stem is an elongated, cylindrical element with two ends, an upper end and a lower end, said stem upper end being threaded, said threaded portion having a top end and a lower end, said stem upper end being threadingly engaged to a lower, top tree, circular nut near to the threaded portion lower end, said stem upper end being extended up into the pivot ball off-centered cylindrical hole through a pivot ball surface opening closest to the top tree plate bottom surface, said stem upper end being extended upward into the pivot ball off-centered opening through the plate bottom surface until the stem lower, top tree circular nut engages the pivot ball radial ridge, said tree stem upper end being attached to said pivot ball cap, said tree stem being notched near to the stem lower end.

5. An adjustable motorcycle triple tree as recited in claim 4, wherein said bottom tree subassembly is comprised of:

a steering stop with a central opening;

a stop block below said steering stop, said stop block having a central opening;

a rake lock block connected to said stop block and being positioned forward of the stop block, said rake lock block being connected to the lower tree;

wherein said tree stem lower end extends downwardly through said steering stop central opening and terminates in said stop block central opening.

6. An adjustable motorcycle triple tree as recited in claim 5, wherein:

the stop block has an upper surface, a parallel lower surface, a vertical depth between said surfaces, a central opening, and a mushroom cross-sectional shape in its horizontal plane, said stop block having a block stem section projecting horizontally forward from the central opening to a transverse front side and having a lateral cylindrical hole formed through the stem depth, from one stem side to another stem side, said hole having a longitudinal central axis parallel to the stem front side, a portion of said cylindrical hole overlapping and opening into the central opening.

7. An adjustable motorcycle triple tree as recited in claim 6, wherein:

said tree stem lower end projects downwardly through the steering stop central opening into the stop block central opening to the stop block lower surface wherein the tree stem lower end is flush with the stop block lower surface, said tree stem being radially positioned so that tree stem lower end notch is facing in a forward direction, wherein a cylindrical pin is inserted into the stop block stem section cylindrical hole from one stem side to another stem side, said pin also engaging the tree stem notch thereby locking said tree stem into place within the stop block.

8. An adjustable motorcycle triple tree as recited in claim 7, wherein:

the rake lock block has a generally rectangular shape in a horizontal plane, and has a front, rear, top surface, bottom surface, two opposite sides connecting the front and rear, and a vertical depth, said rake lock block having a horizontal axis extending from side to side, said rake lock block having two box-shaped protrusions extending rearward from the rear, said protrusions having a lateral separation slightly greater than the distance between stop block stem sides, said protrusions each having a horizontal, cylindrical hole formed therethrough, each said hole having a longitudinal central axis parallel to the front, said rake lock block being attached to the stop block by means of the pin extending through the rake lock block protrusion holes and stop block hole, said rake lock block having three, parallel, elongated slots formed from the top surface through to the bottom surface, said slots each having a horizontal, longitudinal axis parallel to the rake lock block sides, said rake lock block top surface having parallel, ridged corrugations formed therein and extending from side to side, said ridged corrugations having longitudinal axes parallel to the rake lock block front, said rake lock block bottom surface having two parallel, vertical, counter-sunk, screw holes formed therein, one on each side of the middle slot opening, each screw hole extending vertically toward the top surface.

9. An adjustable motorcycle triple tree as recited in claim 8, wherein:

said lower tree is a generally laterally, elongated piece with a top surface, bottom surface, front, rear, two lateral sides, and a vertical depth between said surfaces, said front having a solid, general concave shape, each said side having a rounded portion adjacent to the front, said rounded portion then terminating rearwardly in a flat, inwardly angled portion terminating at the lower tree rear, said lower tree having a vertical hole formed near each lateral side, said vertical holes being formed from the top surface through the lower tree to the bottom surface, said vertical holes providing channels through which the fork tubes are passed, said holes corresponding to the acute angle lobe portion holes formed in the top tree plate, said lower tree having a horizontal cylindrical hole formed into each angled side portion, each said hole having a longitudinal central axis perpendicular to the horizontal plane of the angled side portion, a portion of each hole overlapping and opening into a fork tube opening.

10. An adjustable motorcycle triple tree as recited in claim 9, wherein:

the lower tree bottom surface has a substantially rectangular, central aperture formed therein, said aperture opening onto the lower tree rear, extending almost to the lower tree front, and extending upward and terminating in a flat, corrugated, upper portion below the top surface, said corrugations having longitudinal axes parallel to the lower tree rear, said aperture having a vertical depth approximately equal to the vertical depth of the rake lock block, and a lateral width approximately equal to the rake lock block lateral width, said upper portion having three, parallel, vertical screw holes formed therein, said screw holes being formed along a line having a longitudinal axis parallel to the lower tree rear, said line of screw holes being positioned just forward of a half moon notch formed centrally at the lower tree rear.

11. An adjustable motorcycle triple tree as recited in claim 10, wherein:

the lower tree is positioned over the rake lock block so that the lower tree aperture fits over a portion of the rake lock top surface from the rake block front rearward, wherein the rake block ridged corrugations engage the lower tree aperture flat, corrugated, upper portion, said rake block top surface slot openings coinciding with the lower tree aperture screw holes.

12. An adjustable motorcycle triple tree as recited in claim 11, wherein said rake lock block is further comprised of:

a plurality of attachment screws with washers inserted into the rake lock block bottom surface slot openings through the top surface slot openings into engagement with the lower tree bottom surface aperture screw holes; and a rectangular protective plate positioned over the rake lock bottom surface, said protective plate having two holes corresponding to the rake block bottom surface screw holes; and a screw inserted through each protective plate hole into engagement with a rake bottom surface screw hole.

13. An adjustable motorcycle triple tree as recited in claim 12, wherein:

said steering stop has a ring shape with a central opening, an upper surface and a lower surface, said upper surface having an upwardly projecting flange collar formed thereon about the central opening;

a downwardly projecting stop pin is formed on the steering stop lower surface, said stop pin being positioned to the rear of the steering stop.

14. An adjustable motorcycle triple tree as recited in claim 13, wherein:

said stop block cap portion projects horizontally rearward from the central opening and has a curved vertical channel formed in its upper surface, said curved channel having a radial axis concentric with the radial axis of the central opening, wherein said steering stop pin projects downwardly into the stop block channel.

15. An adjustable motorcycle triple tree as recited in claim 14, wherein:

each rake lock block slot at the rake lock block bottom surface is counter-sunk whereby each slot has a larger opening formed on the bottom surface than its opening at the rake lock block top surface.

16. An adjustable motorcycle triple tree as recited in claim 15, wherein said lower tree is further comprised of:

a tube cam lock assembly comprised of a notched tube clamp and bolt inserted into each cylindrical hole to lock the lower tree in positioned relative to a fork tube; and a rectangular notch formed in the top surface, said notch being positioned centrally near to the lower tree front, said notch having a vertical screw hole formed therein; and a headlight mount positioned in the notch and attached into the screw hole.

17. An adjustable motorcycle triple tree as recited in claim 16, wherein:

the pivot hole lower half circumferential portion has a plurality of screw holes formed in the junction ridge, said screw holes extending downwardly through the lower half circumferential portion and through the plate bottom surface, each said screw hole having a longitudinal axis perpendicular to the radial axis of the central opening.

18. An adjustable motorcycle triple tree as recited in claim 17, wherein:

the ball cap has an outer diameter slightly less than the diameter of the pivot hole upper half portion, said ball cap central opening approximately mirrors the pivot hole lower half portion central opening, said ball cap ring portion having an upper surface, a lower surface and a radial width approximately equal to the radial width of the junction ridge, said ball cap ring portion having a plurality of screw holes formed therein, said screw holes corresponding to the junction ridge screw holes, said ball cap ring portion screw holes extending downwardly from the ring portion upper surface through the lower surface, said screw holes being countersunk at the ring portion upper surface, each said screw hole having a longitudinal axis perpendicular to the radial axis of the central opening, said ball cap ring portion having two cube shaped protrusions extending downwardly through the ring portion lower surface, said cube shaped protrusions being radially 180° apart, each said protrusion having a radial hole formed therein, each said hole having a longitudinal axis coincident with a radial axis of the cap central opening, said cap being fitted over the pivot ball, each said protrusion hole having a pin inserted therethrough into a corresponding pivot ball pin hole, wherein said cap and pivot ball forming an assembly placed into the pivot hole through the pivot hole upper portion, said cap protrusions being fitted into the pivot hole notches, a plurality of screws being placed through the cap screw holes into engagement with the junction ridge screw holes.

19. An adjustable motorcycle triple tree as recited in claim 18, wherein:

said cap is threadingly attached to the tree stem upper end, through the pivot ball surface opening farthest from the top tree plate bottom surface, said cap engaging the stem upper end until the cap meets the pivot ball radial ridge.

20. An adjustable motorcycle triple tree as recited in claim 19, wherein:

said steering stop collar is press fitted into the steering head, hollow bore, open lower end, wherein the tree stem freely turns radially within the steering stop central opening, wherein the steering stop is immovable within the steering head bore.

* * * * *